United States Patent [19]
Williams, Jr.

[11] Patent Number: 4,922,231
[45] Date of Patent: May 1, 1990

[54] IDLE/NO-IDLE LIGHT SYSTEM

[76] Inventor: George A. Williams, Jr., 3417 Birch St., Grove City, Ohio 43123

[21] Appl. No.: 242,939

[22] Filed: Sep. 9, 1988

[51] Int. Cl.$^5$ ............................................. G08B 21/00
[52] U.S. Cl. .................................. 340/584; 340/595; 340/521; 116/216
[58] Field of Search ............... 340/584, 521, 514, 593, 340/595, 661, 691, 227; 374/111; 116/216, 101; 328/148

[56] References Cited

U.S. PATENT DOCUMENTS

| | | | |
|---|---|---|---|
| 1,297,326 | 3/1919 | Dahl et al. | 116/101 |
| 1,577,847 | 3/1926 | Nelsen, Jr. | 116/216 |
| 3,210,748 | 10/1965 | Ohuffer | 116/101 |
| 3,433,075 | 3/1969 | Seatherland | 116/216 |
| 3,516,082 | 6/1970 | Cooper | 116/216 |
| 3,911,412 | 10/1975 | Bennetts | 340/521 |
| 3,927,571 | 12/1975 | Athey | 340/595 |
| 3,959,787 | 5/1976 | Messmann | 116/216 |

Primary Examiner—Michael J. Tokar

[57] ABSTRACT

A temperature responsive signaling device is provided for use at locations where diesel powered trucks congregate. The device includes a light source with at least two colored lights preferably red and green, a control box having at least two indicator lights and a switch for the selection of an operating mode for the signaling device, and temperature responsive means and temperature sensing means. While the control box and temperature responsive means is preferably located inside a building, the temperature responsive means and light source are normally positioned outdoors. A circuit is provided for coupling a power source to the various components of the signaling device such that the light which is activated depends upon the unit's response to a preselected temperature.

20 Claims, 3 Drawing Sheets

IDLE/NO-IDLE LIGHT SYSTEM

BACKGROUND OF THE INVENTION

The present invention relates generally to a temperature responsive signaling device, and more particularly, to such a device for use at locations where diesel powered trucks congregate.

Cold weather presents a problem for diesel powered automotive vehicles, especially trucks of the tractor-trailer variety. In cold weather, diesel engines can encounter problems in starting, even if 15W40 motor oil is used. A large diesel engine acts as a 2500 pound plus heat sink, which at cold temperatures can prevent sufficient pressure from building up within the diesel engine to allow the engine to start. As a result, truckers often leave their vehicles running in cold weather in an attempt to overcome the problem.

However, diesel engines consume 3-5 gallons per hour when idling. Additionally, there are other disadvantages associated with idling besides increased fuel consumption, including increased air pollution, increased engine wear, and an increase in the contamination of run-off water from the concrete or blacktop area where the vehicles are parked. One large diesel carrier conducted a study which determined that it wasted over 1.8 million gallons of fuel one year due to unnecessary idling. This figure translated to over 1.4 million dollars in increased fuel costs, all due to unnecessary idling.

Although the simple solution would seem to be the discontinuation of the practice of idling engines, there are two major drawbacks to that plan. The first problem is that despite the apparent high cost of wasted fuel, that cost is minor compared to the maintenance costs which would be encountered if all diesel engines were shut down in too cold of weather. A second, yet related problem to the first, is that truck drivers are supposed to spend only ten hours of driving time per day, with the "driving time" commencing once the driver leaves his terminal or truck stop and returns to his vehicle. In cases where the truck refuses to start, the driver still is having that time count against him, such that if his rig can be fixed, he will be prone to speed or even perhaps drive in a reckless manner in an attempt to make up for lost time.

One solution to the problem of cold weather starts has been block heaters, which serve to heat the oil of a parked truck. However, a block heater can only be used on one vehicle at a time and places where trucks congregate in large numbers, such as terminals, truck stops, or freeway rest areas, at best provide only a limited number of such heater units.

The traditional approach to the problem has been to permit the trucks to idle when the temperature is sufficiently high enough to hopefully preclude problems with starting. On the other hand, truck drivers are encouraged to leave their vehicles idling when temperatures become sufficiently cold enough that the likelihood of starting problems becomes a real concern. In practice, individuals often rely on their best estimate as to how cold it is, in deciding whether to permit their trucks to idle. Occasionally, truck stops or terminals employ individuals to keep track of the temperature, and if it reaches a certain level, then they manually go from truck to truck to start their engines, or insert the heater units into the truck's oil. Sometimes, terminals have had a single light, which drivers could interpret as being a signal to either idle or not idle their vehicles. However, the specifics of operation for these light systems is unclear.

It is thus apparent that the need exists for an idle/no idle light system for use at locations where diesel powered trucks congregate, to reduce fuel costs as well as minimize maintenance costs associated with excessive idling in cold weather.

SUMMARY OF THE INVENTION

The problems associated with the prior arrangements are overcome in accordance with the present invention by providing a light source, temperature sensing means, temperature responsive means, a control box and circuit means which connect the various components of the temperature responsive signaling device.

In accordance with this invention, the light source utilizes two colored lights depending from arms supported on a stand, with the stand preferably being positioned near or atop a building so as to maximize visibility of the light source in the area where diesel powered trucks congregate. The light source is connected by conventional wiring to a control box having two indicator lights on its front panel, along with a switch for the selection of an operating mode. The switch is also connected to a thermostat which is connected to a temperature sensing device such as a thermistor. The thermistor is also located outside the building, as is the light source.

It is a primary object of the present invention to provide an idle/no-idle light system which is extremely dependable as well as being conveniently and relatively inexpensively installed compared to the advantages obtainable through the use of this system. The important objective is furthered by the fabrication of the device from known components.

Other objects and advantages of the invention will be apparent from the following description, the accompanying drawings and the appended claims.

DETAILED DESCRIPTION OF THE INVENTION

Figure 1:
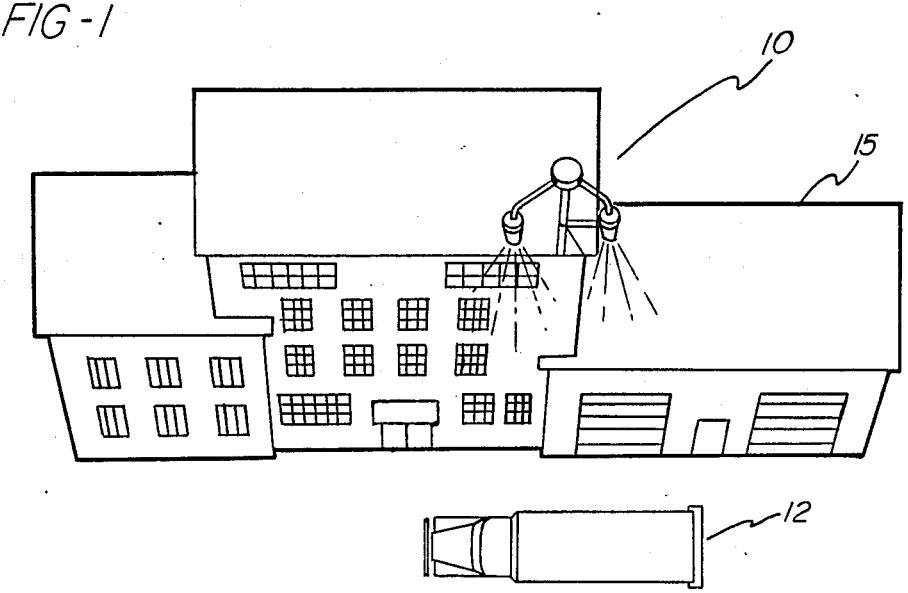
FIG. 1 is a plan view of a temperature responsive signaling device in accordance with the present invention installed in its operative position.

FIG. 1 is a plan view of a temperature responsive signaling device made in accordance with the invention and designed generally by the numeral 10. The temperature responsive signaling device 10 of this invention is specifically designed for use around trucks 12 at locations where a number of them congregate such as terminals, truck stops and highway rest stops. In the preferred form of the invention, the signaling device 10 is positioned near or atop a building 15 so as to be plainly visible to truckers in the vicinity of building 15. The relatively high location for the device is made necessary by the fact that large terminals may have well in excess of 100 trucks parked there.

The most visible component of the temperature responsive signaling device 10 is light stand 17 which serves as a means for supporting the light source 18 of this invention. Stand 17 has a base 19 having first and second legs 21 and 22 respectively. First and second supporting legs 24 and 25 respectively, extend between first and second legs 21 and 22 respectively, and upright supporting member 27. Atop upright supporting member 27 is connector box 29 from which depends first and second elbows 31 and 32 respectively, having first and second colored lights 34 and 35 respectively secured to the opposite ends of the elbows from the connector 29.

In the preferred embodiment of this invention, upright supporting member 27 and first and second elbows 31 and 32 respectively, can be formed from conventional wiring conduit such as metal tubes. First and second legs 21 and 22 and supporting arms 24 and 25 may be fabricated from sheet steel and welded to one another as well as to upright supporting member 27. Additional conduit 37 for wiring 39 is placed near the bottom of the upright supporting member 27. Base 19 may be secured to building 15 by conventional attachment means.

Figure 3:
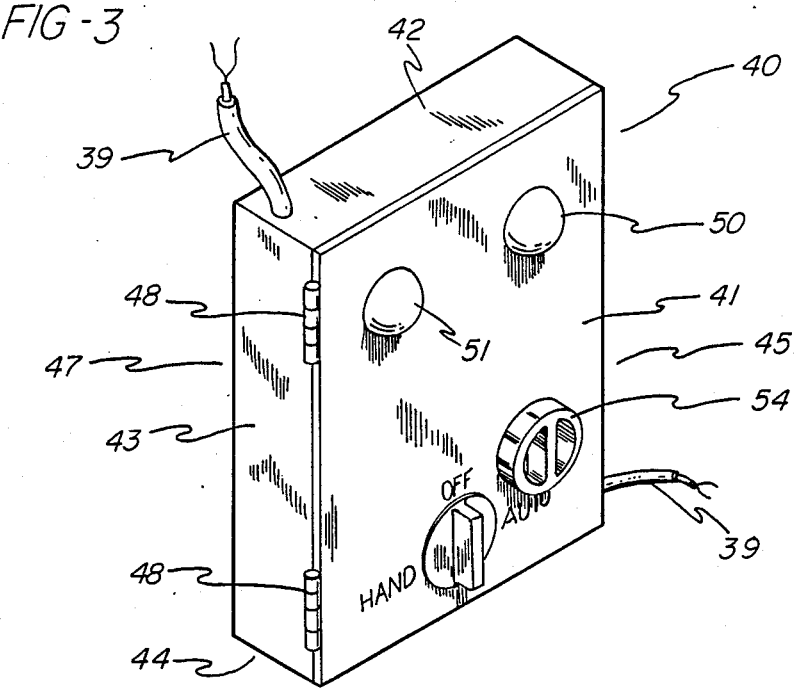
FIG. 3 is a perspective view of the exterior of the control box component of this invention.

FIG. 3 discloses the exterior of control box 40 having front panel 41, top panel 42, hingedly connected side panel 43, bottom panel 44 (not shown) and side panel 45. Front panel 41 is secured to the rear portion 47 of control box 40 by attachment means such as hinge 48.

Figure 2:
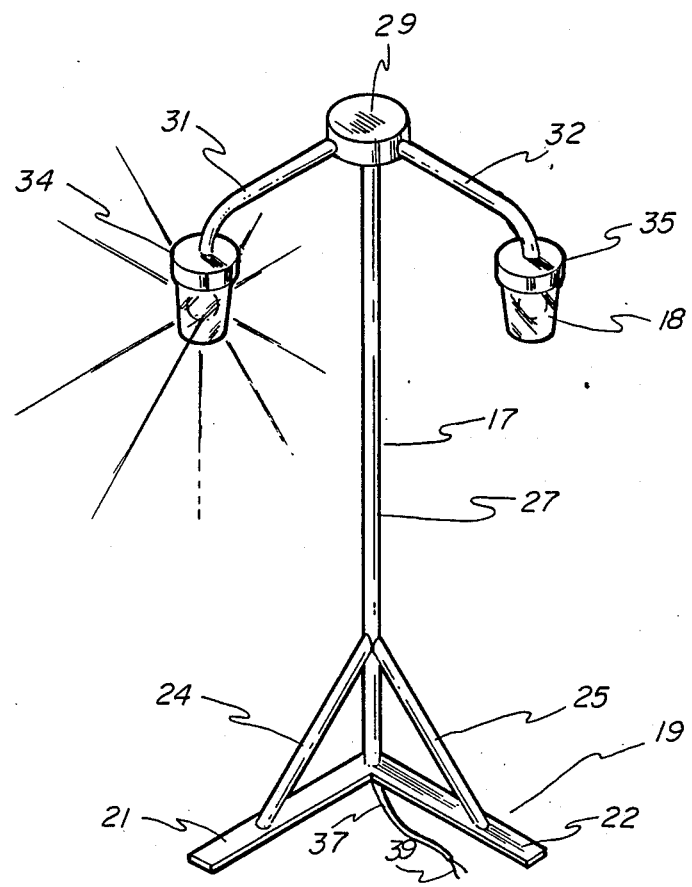
FIG. 2 is a perspective view of the preferred means for supporting the light source of this invention.

Visible on front panel 41 are a pair of indicator lights 50 and 51 which correspond to first and second colored lights 34 and 35. Thus, the red colored light 34 is indicated as being on when red indicator light 50 is lit and green colored light 35 is indicated as being on when green indicator light 51 is lit. A rotatable handle or knob 54 is provided for the opening of the control box. The front panel 41 also includes switch 56 with the switch having a plurality of operating positions. As shown in FIG. 2, the switch may be positioned in the off position as shown, or may be set in the automatic operating mode, or may be positioned in a manual override mode. Wiring 39 enters control box 40 from a power source and passes from control box 20 to permit connection with light source 18.

Figure 4:
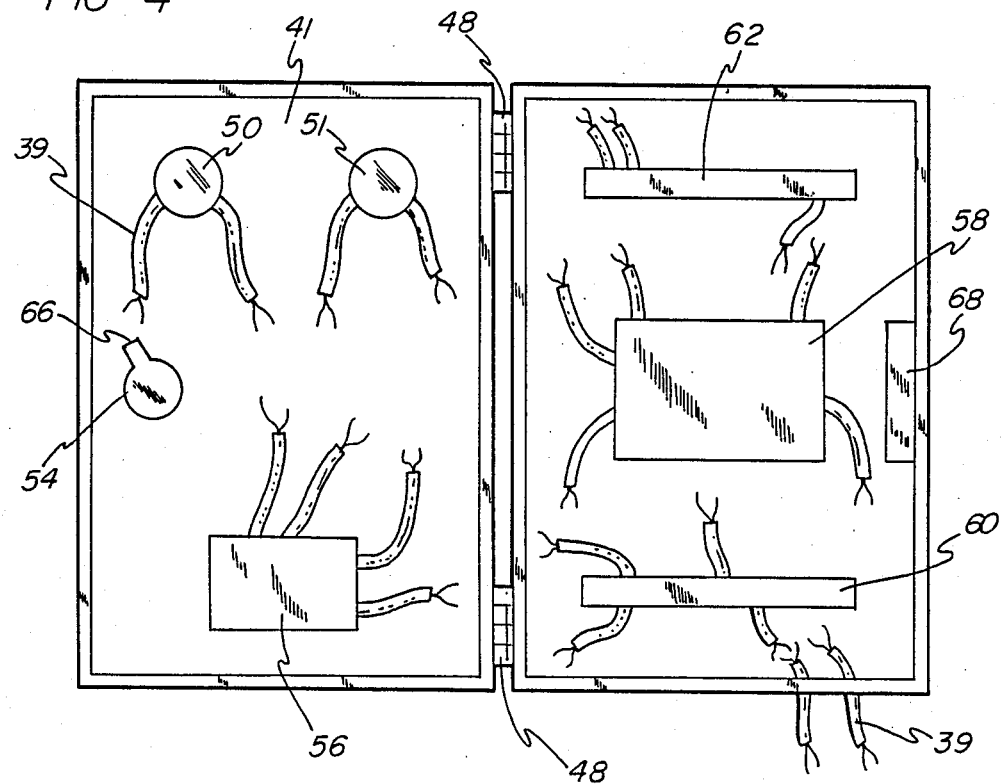
FIG. 4 is a plan view of the control box of FIG. 3 when opened so as to reveal the interior components of the control box.

FIG. 4 discloses the inside of control box 40. Opening front panel 41 by hinges 48 reveals the back portions of red indicator light 50 and green indicator light 51 with wiring 39 depending therefrom. The wiring from the indicator lights 50 and 51 ultimately connect to relay 58. Although in the specific embodiment they may be connected to a first or second terminal block 60 and 62 respectively.

Also seen as being attached to the front panel 41 is the rear portion of switch 56. The wiring from the switch is ultimately connected to the power source, the relay 58 and the temperature responsive means 64. The interior of handle 54 is shown as being formed with a arm portion 66 which can be rotatably secured such that the arm is positioned rearwardly of a locking flange 68.

The control box of this invention preferably is formed from metal and is a conventional electrical control box. Additionally, the handle and the means of securing the front panel to the control box are also well known.

Looking at the right half of FIG. 4, the wiring 39 is shown as entering control box 40, and in one specific embodiment of this invention is connected to both terminal blocks, then to switch 56, and then to the other components which make up the signaling device 10. Meanwhile, the relay 58 could be either of the push connector or module base type. As shown, the relay presently employs a coil with mechanical contacts but it could be of the solidstate type. Preferably the relay is a double throw, single point relay which is connected to the various indicator lights and exterior colored lights. It has been found that for optimization of the system, the exterior first and second colored lights utilize solidstate strobes matched to the voltage of the control system.

Figure 5:
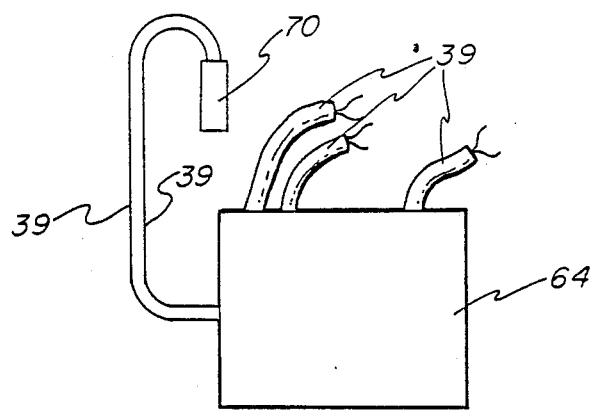
FIG. 5 is a plan view of the temperature sensing means and temperature responsive means components of this invention.

FIG. 5 shows the temperature responsive means 64 of this signaling device as well as the temperature sensing means 70 which is positioned outside along with the first and second colored lights 34 and 35. The temperature responsive means preferably includes a thermostat which is responsive to the temperature of the ambient air adjacent the temperature sensing means. The temperature responsive means controls said light source by permitting at least one of the lights to be turned on while permitting another to be off.

The temperature sensing means preferably can be a thermistor which is connected to the 24 V circuit between itself and the temperature responsive means. The thermostat is set at a preselected temperature, such that when the value is exceeded by the temperature of the ambient air, the electrical circuit which controls the red colored light is closed. Alternatively, when the temperature is equal to or less than the preselected temperature, the temperature responsive means is responsive to that temperature and causes the closing of the electrical circuit which controls the green colored light and opens the circuit which controls the red colored light.

The thermostat of this invention is preferably of a conventional solidstate electronic type. The thermostat feeds a 24 V current to the temperature sensing means which means affects the voltage received back by the thermostat. The thermostat being a temperature responsive means, converts the information received from the thermistor into a temperature reading, which in turn controls relay 58.

Figure 6:
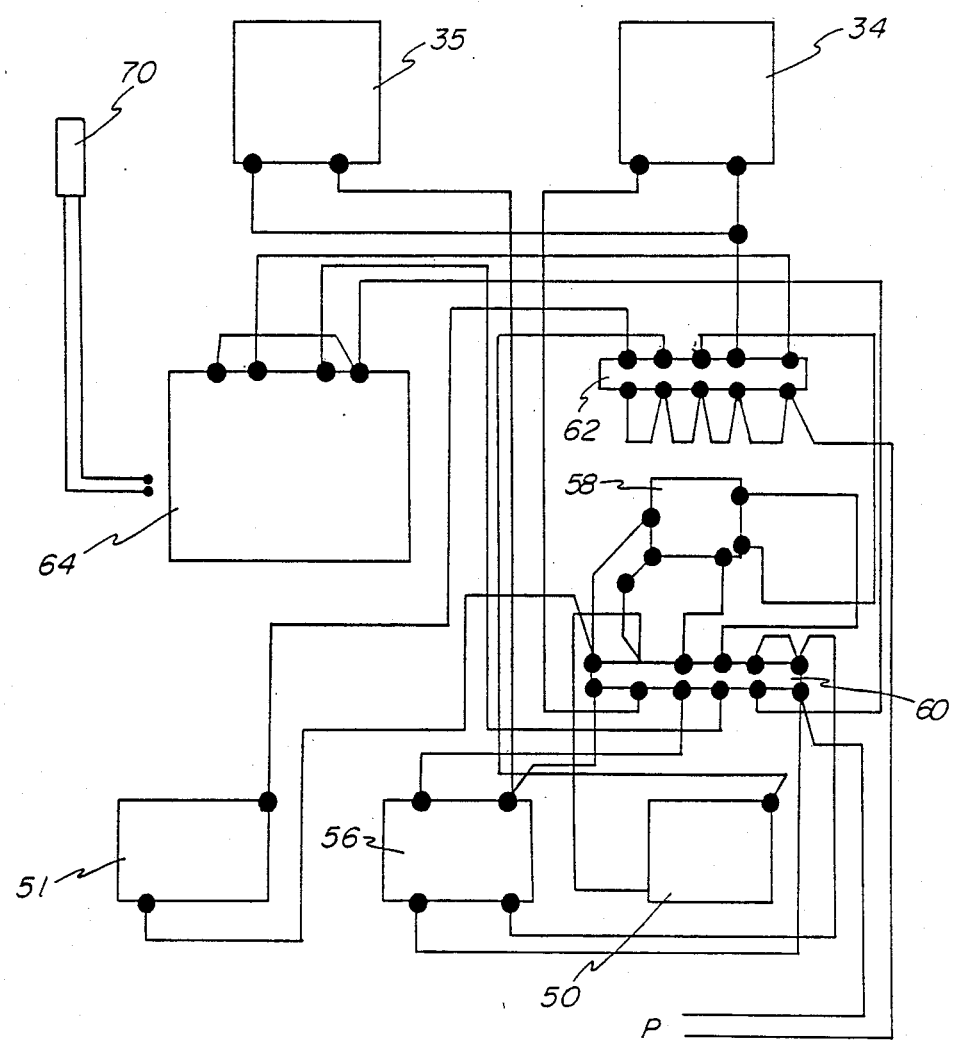
FIG. 6 discloses a schematic for the invention.

FIG. 6 shows one schematic for a temperature responsive signaling device embodying this invention comprising first and second colored lights 34 and 35, a relay 58 with first and second terminal blocks 60 and 62 respectively, a switch 56 with a red and green indicator light 50 and 51, a temperature responsive means 64 such as a thermostat and a temperature sensing means 70 such as a thermistor. One possible schematic for the wiring is shown with the power source for the system being a source P. Other methods of wiring could be utilized, such as those having more direct contacts between the various components and the relay, as opposed to going through the first and second terminal blocks.

In actual operation, the control box, which may even be large enough to house the temperature responsive means 64, is positioned preferably inside a building at a location where diesel powered trucks congregate. The temperature sensing means is positioned outdoors so as to serve as a remote sensor of the ambient air temperature. The light stand 17 with its two colored strobe lights is secured to the top of a building, the exterior wall of the building, or on a tall free-standing pole at a height greater than the height of a tractor-trailer truck, such that the light from the strobe is clearly visible from the cabs of trucks parked in the area surrounding the light source. The light source provides a means of identification, based on which light is on, as to whether an engine should be running or shut down. The thermostat of the device is set at a temperature, for example 20° F., with the temperature being one which is related to the startability of diesel powered trucks.

Once the ambient temperature approaches that of the thermostat setting, in normal practice the device is turned on to the automatic position, which runs through the thermostat. In its normal position, the circuit controlling the red colored light is closed, thereby indicating that since the temperature is greater than its thermostatically preselected value, truck drivers may shut down their engines, since it is unlikely that starting problems will occur at that temperature. Once the temperature reaches the preselected point on the thermostat, the contacts are closed with respect to the green strobe light circuit and opened with respect to the red light circuit. The presence of the strobe is able to attract the attention of an individual, whether it be a truck driver or terminal employee, who can start or shut down an engine. The changing of the strobe from the first color to the second color provides notice to truck drivers and others that diesel truck engines should be left idling since the temperature has gone below its preselected value. Additionally, for those trucks which are currently shut down, the presence of the green light alerts drivers, as well as others employed at that particular location, to start the trucks' engines, since failure to do so could result in problems with starting.

This invention also features a manual override operating mode which becomes particularly useful when the temperature remains just above the preselected value over a prolonged period of time. During this situation, the red light will stay on since technically the temperature is still too high to normally commence idling, but over an extended period of inactivity at such a temperature, some problems may be encountered such that it makes sense to idle. This invention permits the switch to be turned from the automatic operating mode to a manual override mode which turns on the green light.

While the form of apparatus herein described herein constitutes a preferred embodiment of this invention, it is to be understood that the invention is not limited to this precise form of apparatus and that changes may be made therein without departing from the scope of the invention which is defined in the appended claims.

What is claimed is:

1. A temperature responsive signaling device for use at locations where diesel powered trucks congregate comprising:
    a light source, including at least first and second lights, and means for supporting said light source outdoors, said light source being supported at a height greater than the height of a tractor-trailer truck,
    a temperature sensing means positioned outdoors,
    temperature responsive means connected to said temperature sensing means, said temperature responsive means responsive to the temperature of the ambient air adjacent said temperature sensing means being greater than a preselected temperature for closing the electrical circuit which controls said first light, and responsive to the temperature of the ambient air being equal to or less than said preselected temperature for closing the electrical circuit which controls said second light and opening said circuit which controls said first light,
    a control box, said control box including at least two indicator lights, and a switch for the selection of an operating mode for said signaling device, and
    circuit means connecting said light source, said temperature sensing means, said temperature responsive means and said control box.

2. The temperature responsive signaling device according to claim 1 wherein said colored lights are strobes.

3. The temperature responsive signaling device according to claim 2 wherein said first and second lights are colored.

4. The temperature responsive signaling device according to claim 3 wherein said first colored light is red.

5. The temperature responsive signaling device according to claim 4 wherein said second colored light is green.

6. The temperature responsive signaling device according to claim 3 wherein said temperature responsive means comprises a thermostat.

7. The temperature responsive signaling device according to claim 6 wherein said operating mode may automatically be controlled by said temperature responsive means.

8. The temperature responsive signaling device according to claim 7 which includes a manual override operating mode.

9. The responsive signaling device according to claim 8 wherein said control box includes a double throw, single point relay.

10. The temperature responsive signaling device according to claim 9 which includes a relay having a module base.

11. The temperature responsive signaling device according to claim 9 which includes a push connector relay.

12. The temperature responsive signaling device according to claim 6 wherein said temperature sensing means comprises a thermistor.

13. A temperature responsive signaling device for use at locations where diesel powered trucks congregate comprising:
    a light source, said light source supported at a height greater than the height of a tractor-trailer truck, said light source including at least two lights which are visible from the cabs of diesel powered trucks parked in the area surrounding said light source, said light source being able to attract the attention of an individual who can start or shut down an engine of diesel powered truck,
    temperature responsive means connected to a temperature sensing means, said temperature responsive means responsive to the temperature of the ambient air adjacent said temperature sensing means so as to control said light source by permitting at least one of said two lights to be turned on while permitting another light to be off, said light source providing a means of notification, based on which light is on, as to whether an engine of a diesel powered truck should be running or be shut down.

14. The temperature responsive signaling device according to claim 13 wherein said light source includes red and green colored lights.

15. The temperature responsive signaling device according to claim 14 wherein said red light, if turned on, indicates that an engine of a diesel powered truck should be shut down.

16. The temperature responsive signaling device according to claim 14 wherein said green light, if turned on, indicates that an engine of a diesel powered truck should be running.

17. The temperature responsive signaling device according to claim 13 wherein said light source includes at least one strobe light.

18. The temperature responsive signaling device according to claim 17 wherein said light source includes red and green colored lights.

19. The temperature responsive signaling device according to claim 18 wherein said red light, if turned on, indicates that an engine of a diesel powered truck should be shut down.

20. The temperature responsive signaling device according to claim 18 wherein said green light, if turned on, indicates that an engine of a diesel powered truck should be running.

* * * * *